US011355753B2

(12) United States Patent
Ishida et al.

(10) Patent No.: US 11,355,753 B2
(45) Date of Patent: Jun. 7, 2022

(54) NEGATIVE ELECTRODE FOR NICKEL METAL HYDRIDE SECONDARY BATTERY, METHOD OF MANUFACTURING THE NEGATIVE ELECTRODE, AND NICKEL METAL HYDRIDE SECONDARY BATTERY USING THE NEGATIVE ELECTRODE

(71) Applicant: FDK CORPORATION, Tokyo (JP)

(72) Inventors: Jun Ishida, Tokyo (JP); Akira Saguchi, Tokyo (JP); Shota Ohata, Tokyo (JP)

(73) Assignee: FDK CORPORATION, Tokyo (JP)

( * ) Notice: Subject to any disclaimer, the term of this patent is extended or adjusted under 35 U.S.C. 154(b) by 125 days.

(21) Appl. No.: 16/832,811

(22) Filed: Mar. 27, 2020

(65) Prior Publication Data
US 2020/0313179 A1    Oct. 1, 2020

(30) Foreign Application Priority Data

Mar. 29, 2019   (JP) .............................. JP2019-066447

(51) Int. Cl.
*H01M 4/52*        (2010.01)
*C22C 1/04*        (2006.01)
(Continued)

(52) U.S. Cl.
CPC ............. *H01M 4/52* (2013.01); *C22C 1/0433* (2013.01); *C22C 19/00* (2013.01); *H01M 4/242* (2013.01); *H01M 4/32* (2013.01); *H01M 4/364* (2013.01); *H01M 4/38* (2013.01); *H01M 4/621* (2013.01); *H01M 4/625* (2013.01); *H01M 10/30* (2013.01); *H01M 10/345* (2013.01); *H01M 2004/021* (2013.01); *H01M 2004/027* (2013.01)

(58) Field of Classification Search
CPC .......... H01M 4/52; H01M 4/242; H01M 4/32; H01M 4/364; H01M 4/38; H01M 45/621; H01M 4/625; H01M 10/30; H01M 10/345; C22C 1/0433; C22C 19/00
See application file for complete search history.

(56) References Cited

U.S. PATENT DOCUMENTS

| 6,010,582 A | 1/2000 | Ise et al. |
| 2004/0134569 A1* | 7/2004 | Yasuoka ............... H01M 10/26 148/426 |
| 2005/0164083 A1 | 7/2005 | Yasuoka et al. |

FOREIGN PATENT DOCUMENTS

| CN | 105073915 | * 11/2015 | ............. Y02E 60/10 |
| EP | 3439080 A1 | 2/2019 | |

(Continued)

OTHER PUBLICATIONS

Extended European Search Report dated Jan. 9, 2020, for corresponding European Application No. 20162418.6.

*Primary Examiner* — Helen Oi K Conley
(74) *Attorney, Agent, or Firm* — Kinney & Lange, P.A.

(57) ABSTRACT

A negative electrode used in a nickel metal hydride secondary battery includes a negative electrode core body and a negative electrode mixture carried on the negative electrode core body. The negative electrode mixture includes hydrogen storage alloy powder which is an aggregate of hydrogen storage alloy particles, a binder, and a thickener. The hydrogen storage alloy particles have a volume mean particle size of 40 μm or less and a concentration of chlorine of not less than 180 ppm to not more than 780 ppm.

7 Claims, 2 Drawing Sheets

(51) Int. Cl.
*C22C 19/00* (2006.01)
*H01M 4/24* (2006.01)
*H01M 4/32* (2006.01)
*H01M 4/36* (2006.01)
*H01M 4/38* (2006.01)
*H01M 4/62* (2006.01)
*H01M 10/30* (2006.01)
*H01M 10/34* (2006.01)
*H01M 4/02* (2006.01)

(56) References Cited

FOREIGN PATENT DOCUMENTS

| | | | |
|---|---|---|---|
| JP | H09213319 A | 8/1997 |
| JP | H1012231 A | 1/1998 |
| JP | H117948 A | 1/1999 |
| JP | H11323469 A | 11/1999 |
| JP | H11354124 A | 12/1999 |
| JP | 2000285915 A | 10/2000 |

* cited by examiner

NEGATIVE ELECTRODE FOR NICKEL METAL HYDRIDE SECONDARY BATTERY, METHOD OF MANUFACTURING THE NEGATIVE ELECTRODE, AND NICKEL METAL HYDRIDE SECONDARY BATTERY USING THE NEGATIVE ELECTRODE

CROSS-REFERENCE TO RELATED APPLICATION(S)

This application claims priority to Japanese Application No. 2019-066447 filed on Mar. 29, 2019, the contents of which are incorporated herein by reference.

BACKGROUND

Technical Field

The present disclosure relates to a negative electrode for a nickel metal hydride secondary battery, a manufacturing method for the negative electrode, and a nickel metal hydride secondary battery using the negative electrode.

Description of the Related Art

Nickel metal hydride secondary batteries have been used for various applications such as various electronic devices, electric devices, and hybrid electric vehicles from the viewpoint that they are higher in capacity than nickel cadmium secondary batteries and are also excellent in environmental safety.

Hydrogen storage alloys used for negative electrodes of these nickel metal hydride secondary batteries are materials that store and release hydrogen, and are one of important constituent materials in the nickel metal hydride secondary batteries. As such hydrogen storage alloys, for example, $LaNi_5$ hydrogen storage alloy which is a rare-earth-Ni-based hydrogen storage alloy having $CaCu_5$ type crystal as a main phase, hydrogen storage alloys having Laves-phase-based crystals containing Ti, Zr, V and Ni as a main phase, and the like are generally used. A rare-earth-Mg—Ni-based hydrogen storage alloy having a composition in which a part of the rare earth element of the rare-earth-Ni-based hydrogen storage alloy is replaced with Mg has been recently proposed in order to improve the hydrogen storage capacity of the hydrogen storage alloy. This rare-earth-Mg—Ni-based hydrogen storage alloy is capable of storing a larger amount of hydrogen gas than conventional rare-earth-Ni-based hydrogen storage alloys (see Japanese Patent Laid-Open No. H11-323469).

In recent years, the use of nickel-metal hydride secondary batteries has been expanding more and more, so that higher performances have been desired in nickel-hydrogen secondary batteries. One of the performances required for nickel-hydrogen secondary batteries to be enhanced is charging and discharging characteristics. If the charging and discharging characteristics are enhanced, it would be possible to perform discharging at a high rate and perform rapid charging. Furthermore, the use environment of nickel metal hydride secondary batteries has become harsher than past times due to the expansion of applications, and the use of nickel metal hydride secondary batteries under a low temperature environment is assumed. For this reason, a nickel metal hydride secondary battery which is capable of performing high-rate discharging and rapid charging even under a low temperature environment has been desired.

Therefore, in order to enable high-rate discharging and rapid charging of the nickel metal hydride secondary battery, a conductive material is added to a negative electrode to enhance the conductivity of the negative electrode (for example, see Japanese Patent Laid-Open No. H11-007948, Japanese Patent Laid-Open No. H11-354124, etc.). For example, hydrogen storage alloy powder containing hydrogen storage alloy particles having a low particle size of 40 µm or less in volume mean particle size (MV) has been used as hydrogen storage alloy powder. As a result, the reaction area of hydrogen storage alloy increases, and it can exhibit the charging and discharging characteristic excellent as a negative electrode. Furthermore, hydrogen storage alloy particles are modified by subjecting the surfaces of the hydrogen storage alloy particles to an acid treatment to enhance the activity of the hydrogen storage alloy particles, thereby improving charging and discharging reactivity (for example, see Japanese Patent Laid-Open No. H05-323469). When the activity of the surface of the hydrogen storage alloy is enhanced as described above, the charging and discharging reaction becomes smooth, and the charging and discharging characteristics particularly under a low temperature environment are improved.

Here, a negative electrode to be incorporated in a nickel metal hydride secondary battery is usually manufactured by a paste method. In this paste method, first, a negative electrode mixture paste is prepared by adding water to a negative electrode mixture containing hydrogen storage alloy powder, conductive material powder, binder and thickener and kneading these materials. The resultant negative electrode mixture paste is coated onto a negative electrode core body such as a metal porous body. Thereafter, the negative electrode core body holding the negative electrode mixture paste thereon is subjected to a drying step to obtain a resultant intermediate product of the negative electrode holding the negative electrode mixture thereon. The resultant negative electrode intermediate product is rolled and then cut by a predetermined size. As a result, a negative electrode for a nickel metal hydride secondary battery is obtained (for example, see Japanese Patent Laid-Open No. H10-012231).

With respect to hydrogen storage alloy powder that is an aggregate of hydrogen storage alloy particles, chlorine may adhere to the surfaces of the hydrogen storage alloy particles during a manufacturing process, a transport process or the like. In the foregoing acid treatment, when hydrochloric acid is used, chlorine may remain on the surfaces of the hydrogen storage alloy particles.

When the negative electrode mixture paste is prepared by using the hydrogen storage alloy particles under a state where chlorine is present on the surfaces of the hydrogen storage alloy particles as described above, the chlorine may inhibit the functions of the binder and the thickener. As a result, the negative electrode mixture paste is separated into moisture and other components, resulting in a trouble that the negative electrode mixture paste does not form a body or a trouble that the negative electrode mixture falls off from the negative electrode core body, which causes a trouble that negative electrode manufacturability deteriorates. Even when the negative electrode can be barely manufactured, there is a risk that the negative electrode mixture may drop after it is incorporated into a battery, thereby causing a short circuit, which may cause a trouble that the quality of the battery is deteriorated.

In order to avoid the occurrence of the troubles as described above, usually, the hydrogen storage alloy powder is cleaned to remove chlorine before the negative electrode mixture paste is prepared.

As a method for cleaning the hydrogen storage alloy powder, for example, the hydrogen storage alloy powder is put into cleaning water, the cleaning water is stirred to remove chlorine from the surfaces of the hydrogen storage alloy particles, and then the cleaning water containing chlorine and the hydrogen storage alloy powder are separated from each other. A filter method using a filter or a decantation method in which the hydrogen storage alloy particles are precipitated and then supernatant of the cleaning water is removed is used as a method for separating the cleaning water and the hydrogen storage alloy powder from each other.

The cleaning of the hydrogen storage alloy powder is repeatedly performed at a plurality of times in order to remove chlorine as much as possible. However, if this is done, the time required for the cleaning increases, which causes decrease in the manufacturing efficiency of the entire battery.

In particular, when hydrogen storage alloy powder containing hydrogen storage alloy particles having a small particle size which is less than 40 µm in volume mean particle size is cleaned, the filter method has a low working efficiency because the filter is apt to clog, and the decantation method also has a low working efficiency because it takes time to precipitate the hydrogen storage alloy particles.

If the mesh size of the filter is increased in the filter method in order to increase the working efficiency, clogging can be prevented and the working efficiency is increased, but hydrogen storage alloy particles having small particle sizes flow out. Furthermore, if an interval for removing the supernatant of the cleaning water in the decantation method is shortened, the working efficiency is increased, but hydrogen storage alloy particles having small particle sizes likewise flow out because the hydrogen storage alloy particles having small particle sizes float in the supernatant.

As described above, when the hydrogen storage alloy particles having small particle sizes flow out, the amount of the hydrogen storage alloy particles having small particle sizes which have been put to increase the reaction area of the hydrogen storage alloy decreases. As a result, the reaction area of the hydrogen storage alloy decreases, so that desired charging and discharging characteristics cannot be obtained.

In other words, cleaning of the hydrogen storage alloy powder is indispensable to prevent deterioration of negative electrode manufacturability and degradation of battery quality. However, excessive cleaning may lead to a decrease in manufacturing efficiency and deterioration in charging and discharging characteristics of the battery.

Therefore, it has been desired to develop a negative electrode for a nickel metal hydride secondary battery that is capable of ensuring negative electrode manufacturability without sacrificing the charging and discharging characteristics of a battery.

SUMMARY

According to the present disclosure, there is provided a negative electrode for a nickel metal hydride secondary battery comprising a negative electrode core body, and a negative electrode mixture carried on the negative electrode core body, wherein the negative electrode mixture includes hydrogen storage alloy powder which is an aggregate of hydrogen storage alloy particles, a binder, and a thickener, and the hydrogen storage alloy particles have a volume mean particle size of 40 µm or less and a chlorine concentration of not less than 180 ppm and not more than 780 ppm.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Hereinafter, a nickel metal hydride secondary battery 2 (hereinafter referred to as a battery 2) including a negative electrode 26 for a nickel metal hydride secondary battery according to the present disclosure will be described with reference to the drawings. The battery 2 has, for example, a cylindrical shape having an AA-size as shown in FIG. 1.

Figure 1:
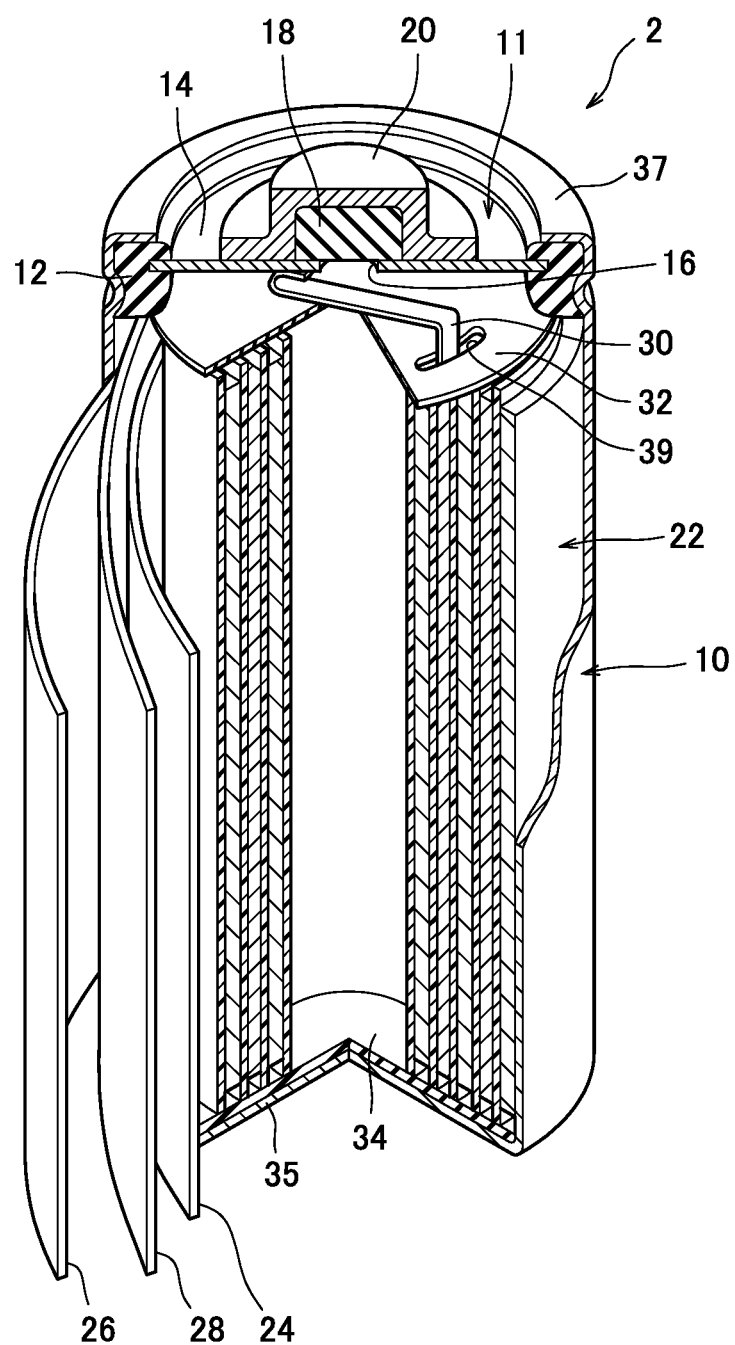
FIG. 1 is a perspective view showing a partially broken nickel metal hydride secondary battery according to an embodiment of the present disclosure.

As shown in FIG. 1, the battery 2 includes an outer packaging can (container) 10 having a bottomed cylindrical shape with an upper end thereof being opened. The outer packaging can 10 has conductivity, and a bottom wall 35 thereof functions as a negative electrode terminal. A sealing body 11 is fixed to the opening of the outer packaging can 10. The sealing body 11 includes a cover plate 14 and a positive electrode terminal 20, and seals the outer packaging can 10 and provides the positive electrode terminal 20. The cover plate 14 is a disk-shaped member having conductivity. The cover plate 14 and a ring-shaped insulating packing 12 surrounding the cover plate 14 are arranged in the opening of the outer packaging can 10, and the insulating packing 12 is fixed to an opening edge 37 of the outer packaging can 10 by caulking the opening edge 37 of the outer packaging can 10. In other words, the cover plate 14 and the insulating packing 12 cooperate with each other to airtightly close the opening of the outer packaging can 10.

Here, the cover plate 14 has a central through-hole 16 in the center. A rubber valve body 18 that blocks the central through-hole 16 is arranged on the outer surface of the cover plate 14. Further, a metal positive electrode terminal 20 having a flanged cylindrical shape is electrically connected to the outer surface of the cover plate 14 so as to cover the valve body 18. The positive electrode terminal 20 presses the valve body 18 toward the cover plate 14. The positive electrode terminal 20 has a gas vent hole (not shown) formed therein.

Normally, the central through-hole 16 is airtightly blocked by the valve body 18. On the other hand, when gas is generated in the outer packaging can 10 and the internal pressure in the outer packaging can 10 increases, the valve body 18 is compressed by the internal pressure to open the central through-hole 16, so that the gas is discharged from the outer packaging can 10 to the outside through the central through-hole 16 and a gas vent hole (not shown) of the positive electrode terminal 20. In other words, the central through-hole 16, the valve body 18, and the positive electrode terminal 20 form a safety valve for the battery 2.

An electrode group 22 is accommodated in the outer packaging can 10. The electrode group 22 includes a positive electrode 24, a negative electrode 26, and a separator 28 each of which has a strip-like shape. Specifically, the electrode group 22 is spirally wound with the separator 28 being interposed between the positive electrode 24 and the negative electrode 26. In other words, the positive electrode 24 and the negative electrode 26 are overlapped with each other via the separator 28. An outermost periphery of the electrode group 22 is formed by a part (an outermost periphery) of the negative electrode 26, and is in contact with an inner peripheral wall of the outer packaging can 10. In other words, the negative electrode 26 and the outer packaging can 10 are electrically connected to each other.

In the outer packaging can 10, a positive electrode lead 30 is arranged between one end of the electrode group 22 and the cover plate 14. Specifically, the positive electrode lead 30 has one end connected to the positive electrode 24, and the other end connected to the cover plate 14. Therefore, the positive electrode terminal 20 and the positive electrode 24 are electrically connected to each other via the positive electrode lead 30 and the cover plate 14. Note that a circular upper insulating member 32 is arranged between the cover plate 14 and the electrode group 22, and the positive electrode lead 30 extends through a slit 39 provided in the upper insulating member 32. In addition, a circular lower insulating member 34 is also arranged between the electrode group 22 and a bottom wall 35 of the outer packaging can 10.

Furthermore, a predetermined amount of alkaline electrolyte (not shown) is injected into the outer packaging can 10. The alkaline electrolyte is impregnated in the electrode group 22 to advance an electrochemical reaction (charging and discharging reaction) between the positive electrode 24 and the negative electrode 26. It is preferable that an alkaline electrolyte containing KOH, NaOH, or LiOH as a solute is used as the alkaline electrolyte.

As a material of the separator 28 may be used, for example, a material obtained by providing a polyamide fiber nonwoven fabric with hydrophilic functional groups or providing a polyolefin fiber nonwoven fabric of polyethylene or polypropylene with hydrophilic functional groups. Specifically, it is preferable to use a nonwoven fabric mainly including polyolefin fiber that has been subjected to a sulfonation treatment to be provided with sulfone groups. Here, the sulfone groups are imparted by performing a treatment on the nonwoven fabric with an acid containing sulfuric acid groups such as sulfuric acid or fuming sulfuric acid. A battery using a separator including such a fiber having sulfone groups exhibits excellent self-discharging characteristics.

The positive electrode 24 includes a conductive positive electrode substrate having a porous structure, and a positive electrode mixture retained in pores of the positive electrode substrate.

As such a positive electrode substrate may be used, for example, a net-like, sponge-like or fibrous metal body plated with nickel, or nickel foam can be used.

The positive electrode mixture includes positive electrode active material particles, a conductive material, a positive electrode additive, and a binder. This binder serves to bind the positive electrode active material particles, the conductive material, and the positive electrode additive to one another and simultaneously bind the positive electrode mixture to the positive electrode substrate. Here, as the binder may be used, for example, carboxymethylcellulose, methylcellulose, PTFE (polytetrafluoroethylene) dispersion, HPC (hydroxypropyl cellulose) dispersion, or the like.

The positive electrode active material particles are nickel hydroxide particles or higher order nickel hydroxide particles. Note that it is preferable that at least one element of zinc, magnesium, and cobalt is dissolved in these nickel hydroxide particles.

As the conductive material may be used, for example, one or more kinds selected from cobalt compounds such as cobalt oxide (CoO) and cobalt hydroxide ($Co(OH)_2$) and cobalt (Co). This conductive material is added to the positive electrode mixture as necessary, and may be added to the positive electrode mixture in the form of powder or in the form of a coating covering the surface of the positive electrode active material.

The positive electrode additive is added to improve the characteristics of the positive electrode. For example, yttrium oxide, zinc oxide, or the like may be used.

The positive electrode active material particles can be manufactured as follows, for example.

First, an aqueous solution of nickel sulfate is prepared. An aqueous solution of sodium hydroxide is gradually added to the aqueous solution of nickel sulfate to react these aqueous solutions with each other, thereby precipitating nickel hydroxide particles. Here, when zinc, magnesium, and cobalt are dissolved in nickel hydroxide particles, nickel sulfate, zinc sulfate, magnesium sulfate, and cobalt sulfate are weighed so as to obtain a predetermined composition, and a mixed aqueous solution of these aqueous solutions is prepared. An aqueous solution of sodium hydroxide is gradually added to the resultant mixed aqueous solution while stirring the mixed aqueous solution to cause a reaction therebetween, thereby precipitating positive electrode active material particles mainly including nickel hydroxide and containing zinc, magnesium and cobalt as solid solutions.

The positive electrode 24 can be manufactured as follows, for example.

First, a positive electrode mixture paste containing positive electrode active material powder which is an aggregate of positive electrode active material particles obtained as described above, a conductive material, a positive electrode additive, water, and a binder is prepared. The resultant positive electrode mixture paste is filled in nickel foam, for example, and subjected to a drying treatment. After dried, the nickel foam filled with nickel hydroxide particles and the like is rolled out and then cut. As a result, the positive electrode 24 carrying the positive electrode mixture thereon is manufactured.

Next, the negative electrode 26 will be described.

The negative electrode 26 includes a conductive negative electrode core body having a strip-like shape, and a negative electrode mixture carried on the negative electrode core body.

The negative electrode core body is formed of a sheet-like metal material in which through-holes are distributed. For example, a punched metal sheet or a sintered substrate obtained by die-molding and sintering metal powder may be used. The negative electrode mixture is not only filled in the through-holes of the negative electrode core body, but also retained in the form of a layer on both surfaces of the negative electrode core body.

The negative electrode mixture includes particles of hydrogen storage alloy (hydrogen storage alloy particles) capable of storing and releasing hydrogen as a negative electrode active material, a binder, a thickener, and a conductive material. Moreover, a negative electrode adjuvant may be added to the negative electrode mixture as needed.

The binder serves to bind the hydrogen storage alloy particles and the conductive material to each other and simultaneously bind these materials to the negative electrode core body. Here, styrene butadiene rubber (SBR), hydrophilic polymer, hydrophobic polymer, or the like may be used as the binder.

The thickener imparts viscosity to the negative electrode mixture paste described later to facilitate molding of the negative electrode. Here, carboxymethyl cellulose may be used as the thickener.

The conductive material imparts conductivity to the negative electrode mixture, and carbon black or graphite may be used. In particular, since hollow carbon black having a hollow shell-like structure is superior in conductivity as compared with conventional carbon black, it is preferable to use hollow carbon black as the conductive material.

Sodium polyacrylate or the like may be used as the negative electrode adjuvant.

The hydrogen storage alloy in the hydrogen storage alloy particles is not particularly limited, and it is preferable to use hydrogen storage alloy used in general nickel metal hydride secondary batteries. More preferably, hydrogen storage alloy having a composition represented by the following general formula (I) is used.

$$Ln_{1-x}Mg_xNi_{y-a}Al_a \qquad (I)$$

In the general formula (I), Ln represents at least one element selected from the group consisting of a rare earth element (La, Ce, Pr, Nd, Pm, Sm, Eu, Gd, Tb, Dy, Ho, Er, Tm, Yb, Lu, Sc, Y), Ti and Zr, and subscripts x, y, and a satisfy the relationship represented by $0<x<0.30$, $2.80 \leq y \leq 3.90$, and $0.10 \leq a \leq 0.25$, respectively.

Here, in the hydrogen storage alloy according to the general formula (I), Ln and Mg are A components, and Ni and Al are B components. The hydrogen storage alloy according to the general formula (I) has a crystal structure in which an $AB_2$ type unit and an $AB_5$ type unit are stacked. Specifically, the hydrogen storage alloy has a so-called superlattice structure taking an $A_2B_7$ type structure or an $A_5B_{19}$ type structure in which the $AB_2$ type unit and the $AB_5$ type unit are stacked. The hydrogen storage alloy having such a superlattice structure has both of an advantage that hydrogen storage and release performance is stable, which is a feature of the $AB_5$ type alloy, and an advantage that a storage amount of hydrogen is large, which is a feature of the $AB_2$ type alloy. Therefore, since the hydrogen storage alloy according to the general formula (I) is excellent in hydrogen storage capability, it contributes to the high capacity of the battery 2 obtained.

Note that in the hydrogen storage alloy according to the general formula (I) described above, a part of Ni may be replaced with another element (for example, at least one element selected from the group consisting of V, Nb, Ta, Cr, Mo, Mn, Fe, Co, Ga, Zn, Sn, In, Cu, Si, P, and B) to the extent that the crystal structure is not changed.

Here, the average particle diameter of the hydrogen storage alloy particles is set to 40 μm or less. Note that in the present disclosure, the average particle diameter means a volume mean particle size (MV) obtained by a laser diffraction/scattering method using a particle size distribution measuring apparatus.

When the volume mean particle size of the hydrogen storage alloy particles is equal to 40 μm or less, the reaction area of the hydrogen storage alloy contained in the negative electrode becomes relatively large, which contributes to the improvement of the charging and discharging characteristics of the battery. In addition, when the volume mean particle size of the hydrogen storage alloy particles is equal to 40 μm or less, occurrence of cracks in the hydrogen storage alloy particles caused by charging and discharging of the battery is reduced, and the reaction area of the hydrogen storage alloy is difficult to change, so that the charging and discharging reaction is stabilized.

In the hydrogen storage alloy particles according to the present disclosure, the concentration of chlorine is set in a range from not less than 180 ppm to not more than 780 ppm. In the hydrogen storage alloy particles, chlorine may exist mainly on the surfaces of the particles. Examples of this chlorine include chlorine that adheres during a manufacturing process or a transportation process of hydrogen storage alloy particles, or chlorine that adheres due to a treatment using hydrochloric acid described later.

Chlorine existing on the surfaces of the hydrogen storage alloy particles is usually removed by cleaning. In this cleaning step, the concentration of chlorine existing on the surfaces of the hydrogen storage alloy particles is set in the range from not less than 180 ppm to not more than 780 ppm by adjusting the degree of cleaning. When the cleaning is performed until the concentration of chlorine is less than 180 ppm, the number of particles of small particle sizes having the volume mean particle size (MV) of 40 μm or less decreases, and a particle size distribution changes. In other words, the percentage of particles having a relatively large particle size increases, and the surface area (reaction area) of the hydrogen storage alloy becomes smaller than a target area, which adversely affects the charging and discharging characteristics of the battery. On the other hand, when the concentration of chlorine exceeds 780 ppm, a residual amount of chlorine becomes relatively large, and when the negative electrode mixture paste is formed, the properties of the binder and thickener are changed, which adversely affects the manufacturability of the negative electrode and the quality of the battery. Therefore, the concentration of chlorine existing on the surfaces of the hydrogen storage alloy particles is set in the range from not less than 180 ppm to not more than 780 ppm.

In the hydrogen storage alloy particles, it is preferable that Ni-rich surface layers are formed on the surfaces of the hydrogen storage alloy particles in order to promote the charging and discharging reaction. When the Ni-rich surface layers exist as described above, the surface of the hydrogen storage alloy is activated to promote the charging and discharging reaction in the hydrogen storage alloy (negative electrode) represented by the following formulas (II) and (III). In other words, the Ni-rich surface layer is a layer of catalyst Ni that functions as a catalyst for the charging and discharging reaction.

$$\text{Charging:} MH + OH^- \leftarrow M + H_2O + e^- \qquad (II)$$

$$\text{Discharging:} MH + OH^- \rightarrow M + H_2O + e^- \qquad (III)$$

Note that M represents the hydrogen storage alloy, and MH represents metal hydride.

Here, since Ni is a magnetic material, the amount of Ni existing on the surfaces of the hydrogen storage alloy particles can be estimated by measuring saturation magnetization. Therefore, in the present disclosure, the saturation magnetization of the hydrogen storage alloy particles is preferably set in the range from not less than 1.7 emu/g to not more than 15 emu/g.

When the saturation magnetization of the hydrogen storage alloy particles is less than 1.7 emu/g, a surface layer containing a sufficient amount of Ni is not formed on the surfaces of the hydrogen storage alloy particles, and thus the charging and discharging reaction of the negative electrode is not sufficiently promoted. Particularly, the discharge capacity of the battery under a low temperature environment such as an environment of 0° C. or less cannot be secured sufficiently. On the other hand, when the saturation magnetization of the hydrogen storage alloy particles exceeds 15 emu/g, the percentage of Ni increases excessively, and an electrochemical capacity of the hydrogen storage alloy decreases. As a result, a sufficient negative electrode capacity cannot be obtained, which is not desirable. For example, when the saturation magnetization is equal to 15 emu/g, about half of one hydrogen storage alloy particle has become a catalyst Ni.

From the foregoing, in order to obtain a surface layer of catalyst Ni that can sufficiently promote the charging and discharging reaction of the negative electrode while sufficiently securing the negative electrode capacity, it is preferable that the saturation magnetization of the hydrogen storage alloy particles is set in the range from not less than 1.7 emu/g to nor more than 15 emu/g.

Here, when the saturation magnetization of the hydrogen storage alloy particles is measured, a magnetometer is used. It is preferable that an alternating gradient magnetometer (AGM) or a vibrating sample magnetometer (VSM) is used as the magnetometer, for example. In the present disclosure, with respect to the value of the saturation magnetization, a value obtained when magnetic field of 10 kOe is applied is set as the value of the saturation magnetization.

Next, a procedure for manufacturing the negative electrode 26 will be described below.

First, hydrogen storage alloy powder that is an aggregate of hydrogen storage alloy particles is prepared, for example, as follows.

Metal raw materials are weighed and mixed so as to have a predetermined composition, and this mixture is melted in, for example, a high frequency induction melting furnace, and then cooled to obtain an ingot. The resultant ingot is heated to 900 to 1200° C. in an inert gas atmosphere, and is kept as it is for 5 to 24 hours to perform a heat treatment on the ingot. Thereafter, the ingot which has been cooled to room temperature is pulverized and sieved. This sieving brings hydrogen storage alloy powder which is an aggregate of hydrogen storage alloy particles having a volume mean particle size of 40 μm or less.

Next, the resultant hydrogen storage alloy powder is cleaned. In this cleaning step, the resultant hydrogen storage alloy powder is put into cleaning water, and the cleaning water is stirred to wash away chlorine existing on the surfaces of the hydrogen storage alloy particles. Thereafter, the cleaning water and the hydrogen storage alloy powder are separated from each other. At this time, either water or an alkaline aqueous solution is used as the cleaning water, and it is preferable that the temperature of the water and the alkaline aqueous solution is set in a range from 15° C. to 60° C.

Here, it is preferable that the separation of the cleaning water and the hydrogen storage alloy powder from each other is performed by either the filter method or the decantation method. Regardless of whether the cleaning is performed by adopting the filter method or by adopting the decantation method, conditions under which the concentration of chlorine existing on the surfaces of the hydrogen storage alloy particles after the cleaning is in the range from not less than 180 ppm to not more than 780 ppm are grasped in advance, and the cleaning is performed under the condition.

For example, in the case of the filter method, a predetermined amount of hydrogen storage alloy powder is put into a predetermined amount of cleaning water at a predetermined temperature. Then, a stirring rod having a mixing impeller is inserted into the cleaning water, and the stirring rod is rotated at a predetermined rotational speed to stir the cleaning water for a predetermined time. Thereafter, the cleaning water which has been stirred is poured into a filter whose mesh size is set to a predetermined value, whereby the cleaning water and the hydrogen storage alloy powder are separated from each other, thereby extracting the hydrogen storage alloy powder. Such a cycle of stirring and separation is defined as one cycle, and the cycle is repeated at a plurality of times. At this time, the concentration of chlorine in the resultant hydrogen storage alloy powder is measured according to an ICP emission spectroscopic analysis method (high frequency inductively coupled plasma emission spectroscopic analysis method) by using an emission spectrophotometer for each cycle. The relationship between the number of cycles and the concentration of chlorine is grasped, and conditions under which the concentration of chlorine existing on the surfaces of the hydrogen storage alloy particles is in the range from not less than 180 ppm to not more than 780 ppm are determined from the foregoing relationship. Under the condition, the hydrogen storage alloy powder is cleaned so that the concentration of chlorine falls within the above range.

On the other hand, in the case of the decantation method, a predetermined amount of hydrogen storage alloy powder is put into a predetermined amount of cleaning water at a predetermined temperature. Then, a stirring rod having a mixing impeller is inserted into the cleaning water, and the stirring rod is rotated at a predetermined rotational speed to stir the cleaning water for a predetermined time. Thereafter, the cleaning water is left to stand for a predetermined time. When the hydrogen storage alloy particles have precipitated, supernatant of the cleaning water is removed, and the hydrogen storage alloy powder is taken out. Such a cycle of stirring and removal of the supernatant of cleaning water is defined as one cycle, and the cycle is repeated at a plurality of times. At this time, the concentration of chlorine is measured according to the ICP emission spectroscopic analysis method by using the emission spectrophotometer for the hydrogen storage alloy powder obtained in each cycle. The relationship between the number of cycles and the concentration of chlorine is grasped, and conditions under which the concentration of chlorine existing on the surfaces of the hydrogen storage alloy particles is in the range from not less than 180 ppm to not more than 780 ppm are determined from the foregoing relationship. Under this condition, the hydrogen storage alloy powder is cleaned so that the concentration of chlorine falls within the above range.

The hydrogen storage alloy powder in which the concentration of chlorine existing on the surfaces of the hydrogen storage alloy particles is in the range from not less than 180 ppm to not more than 780 ppm is obtained by the cleaning step as described above.

Here, with respect to the hydrogen storage alloy particles according to the present disclosure, it is preferable that a layer of catalyst Ni is formed on the surface of the hydrogen storage alloy particle in order to promote the charging and discharging reaction. This catalyst Ni layer is formed through an acid treatment step as shown below. Particularly, when hydrochloric acid is used in the acid treatment step, the acid treatment step is performed before the above-described cleaning step. In other words, it is necessary to apply the cleaning step after the acid treatment step, so that the concentration of chlorine existing on the surfaces of the hydrogen storage alloy particles is in the range from not less than 180 ppm to not more than 780 ppm.

Figure 2:
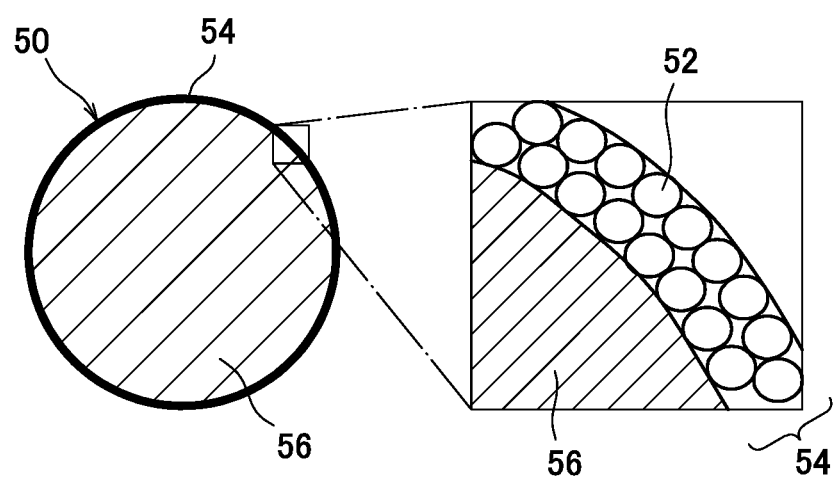
FIG. 2 is a cross-sectional view schematically showing a structure of hydrogen storage alloy particles.

In the acid treatment step, an acid treatment is performed on the hydrogen storage alloy powder which is an aggregate of hydrogen storage alloy particles having a volume mean particle size of 40 μm or less. Specifically, acid at a normal temperature of 15° C. to 25° C. is prepared, and hydrogen storage alloy powder is put into a container containing the acid therein, and then stirred for a predetermined time. With respect to the hydrogen storage alloy particles 50 which have been subjected to such an acid treatment, as shown in FIG. 2, components such as rare earth elements, Mg, and Al other than Ni are dissolved by acid on the surfaces of the hydrogen storage alloy particles 50, and Ni 52 that is hardly dissolved by the acid remains, so that a Ni-rich surface layer 54 is formed. A core portion 56 of hydrogen storage alloy having a predetermined alloy composition exists inside the surface layer 54.

After the above-described stirring for the predetermined time has been completed, water whose amount is twice or more that of the acid is added into the container, and stirred again for the predetermined time. Thereafter, the mixed solution of the acid and the water in the container is left to stand and held until the hydrogen storage alloy powder has precipitated. After the hydrogen storage alloy powder has precipitated, supernatant of the mixed solution is removed, whereby the acid treatment has been finished. Thereafter, the above-described cleaning step is applied.

Here, in the acid treatment, the relationship between the stirring time of the hydrogen storage alloy powder put into the acid and the saturation magnetization of the hydrogen storage alloy particles after the acid treatment is grasped in advance. Specifically, the acid treatment was performed by using a predetermined concentration of acid while changing the stirring time, and the saturation magnetization of the hydrogen storage alloy particles for each stirring time was measured. Conditions for the stirring time when the saturation magnetization is in the range from not less than 1.7 emu/g to not more than 15 emu/g are grasped in advance.

Note that the acid used in the acid treatment is not particularly limited, and for example, hydrochloric acid, nitric acid, sulfuric acid or the like can be used. With respect to these acids, it is preferable that the concentrations of these acids are set to appropriate concentrations so that metal components other than Ni are dissolved and Ni is not so much dissolved. Here, since hydrochloric acid is easier to handle than the other acids, it is preferable to use hydrochloric acid for this acid treatment.

Next, the hydrogen storage alloy powder that has been subjected to the cleaning step, or the hydrogen storage alloy powder that has been subjected to the acid treatment step and the cleaning step, a conductive material, a binder, and water are mixed and kneaded to prepare a negative electrode mixture paste. The resultant negative electrode mixture paste is coated onto a negative electrode core body and dried. After the drying, the negative electrode core body on which the hydrogen storage alloy particles and the like are attached is rolled out and cut, whereby the negative electrode 26 is manufactured.

The positive electrode 24 and the negative electrode 26 produced as described above are assembled with the separator 28 being interposed therebetween, and the resultant assembly of the positive electrode 24, the separator 28 and the negative electrode 26 is spirally wound. In this way, the electrode group 22 is formed.

The resultant electrode group 22 is accommodated in the outer packaging can 10. Subsequently, a predetermined amount of alkaline electrolyte is injected into the outer packaging can 10. Thereafter, the outer packaging can 10 accommodating the electrode group 22 and the alkaline electrolyte therein is sealed by the cover plate 14 having the positive electrode terminal 20 to obtain the battery 2 according to the present disclosure. The thus-obtained battery 2 is subjected to initial activation processing and is allowed to be used.

EXAMPLES

1. Manufacturing of Battery

Example 1

(1) Production of Hydrogen Storage Alloy Powder and Negative Electrode

First, Nd, Mg, Ni, and Al were weighed to prepare a mixture in which these materials were mixed in a predetermined ratio. A resultant mixture was melted in a high-frequency induction melting furnace, and molten metal of the mixture was poured into a mold and then cooled to room temperature to obtain an ingot of hydrogen storage alloy. A sample collected from this ingot was set in the emission spectrophotometer and subjected to composition analysis according to the ICP emission spectroscopic analysis method. As a result, the composition of the hydrogen storage alloy was analyzed as $Nd_{0.90}Mg_{0.10}Ni_{3.33}Al_{0.17}$.

Next, the ingot was subjected to a heat treatment in which the ingot was held for 10 hours at a temperature of 1000° C. in an argon gas atmosphere. The ingot of hydrogen storage alloy which was cooled to room temperature after the heat treatment was mechanically pulverized in an argon gas atmosphere to obtain powder composed of hydrogen storage alloy particles. The resultant powder was sieved to obtain hydrogen storage alloy powder having a predetermined particle size.

Next, the resultant hydrogen storage alloy powder was subjected to an acid treatment. In the acid treatment, 1N hydrochloric acid was prepared. Then, the hydrogen storage alloy powder and the prepared hydrochloric acid were mixed at a mass ratio of hydrogen storage alloy powder to hydrochloric acid of 1:1.5, and the hydrochloric acid containing the hydrogen storage alloy powder was stirred. This stirring operation was continued for 30 minutes at a rotational speed of 60 rotations per minute, and then finished. During the stirring operation, the temperature of hydrochloric acid was kept at 25° C. After the stirring was finished, the pH of hydrochloric acid was 5.0.

Next, cleaning was performed according to the following procedure.

First, hydrochloric acid for which the stirring has been completed was left to stand so that the hydrogen storage alloy powder was precipitated, and the hydrochloric acid in the supernatant was removed.

Next, as first cleaning, water (cleaning water) of 25° C. whose amount was twice the amount of hydrochloric acid which had been removed was prepared, the cleaning water was added to the hydrogen storage alloy powder, and an operation of stirring the cleaning water was performed for 10 minutes at a rotational speed of 60 rotations per minute. After the stirring was terminated, the cleaning water was left to stand so that the hydrogen storage alloy powder was precipitated, and the supernatant of the cleaning water was removed.

Next, as second cleaning, water (cleaning water) of 50° C. whose amount was the same as that in the first cleaning was prepared, the cleaning water was added to the hydrogen storage alloy powder which had been subjected to the first cleaning, and an operation of stirring the cleaning water was performed for 10 minutes at a rotation speed of 60 rotations per minute. After the stirring, the cleaning water was left to stand so that the hydrogen storage alloy powder was precipitated, and the supernatant of the cleaning water was removed.

Next, as third cleaning, water (cleaning water) of 25° C. whose amount was the same as that in the second cleaning was prepared, the cleaning water was added to the hydrogen storage alloy powder which had been subjected to the second cleaning, and an operation of stirring the cleaning water was performed for 10 minutes at a rotational speed of 60 rotations per minute. After the stirring was terminated, the cleaning water was left to stand so that the hydrogen storage alloy powder was precipitated, and the supernatant of the cleaning water was removed. The same operation as the third cleaning was further repeated at three times, and the cleaning was performed totally at six times. The pH of the cleaning water after the final cleaning was 6.0.

The hydrogen storage alloy powder for which the cleaning was terminated was subjected to a drying treatment to obtain hydrogen storage alloy powder according to the example 1.

Here, the particle diameter of particles of the obtained hydrogen storage alloy powder was measured by using a laser diffraction/scattering type particle size distribution measuring apparatus, and a measurement result indicated that the volume means particle size (MV) of the hydrogen storage alloy particles was equal to 35 μm. Further, a measurement result of d10 which was a particle size at a cumulative distribution of 10% indicated that the value of d10 was equal to 11.1 μm. These results are shown in columns of "VOLUME MEAN PARTICLE SIZE MV" and "d10" in Table 1.

Further, a part of the obtained hydrogen storage alloy powder was separated, and a sample for measurement of chlorine concentration and a sample for measurement of saturation magnetization were collected from the separated part.

Then, the sample for measurement of chlorine concentration was set in an emission spectrophotometer, and the chlorine concentration was measured according to the ICP emission spectroscopic analysis method. As a result, the chlorine concentration on the surfaces of the hydrogen storage alloy particles after the acid treatment was equal to 180 ppm. This result is shown in a column of "CONCENTRATION OF CHLORINE" in Table 1.

The sample for measurement of the saturation magnetization was set in a vibration sample type magnetometer, and saturation magnetization when magnetic field of 10 kOe was applied was measured. As a result, the saturation magnetization was equal to 2.29 emu/g. This result is shown in a column of "SATURATION MAGNETIZATION" in Table 1.

100 parts by mass of the obtained hydrogen-absorbing alloy powder was added with 0.4 parts by mass of sodium polyacrylate, 0.1 parts by mass of carboxymethylcellulose, and 1.0 parts by mass of dispersion of 50% solid content of styrene butadiene rubber (SBR), 0.5 parts by mass of hollow carbon black having a hollow shell structure, and 30 parts by mass of water, and kneaded to prepare a negative electrode mixture paste.

When the obtained paste was held for 1 hour, the state of the paste was observed and it was confirmed whether the negative electrode mixture component and water were separated from each other, and no separation was confirmed. This result is shown in a column of "SEPARATION OR NO SEPARATION IN PASTE AFTER ONE HOUR" in Table 1. In Table 1, when no separation was confirmed, it is indicated by "NOT SEPARATED", and when separation was confirmed, it is indicated by "SEPARATED". Evaluations for examples 2 to 4 and comparative examples 1 and 2 described later are likewise made.

Next, the paste of the negative electrode mixture was uniformly coated on both surfaces of a perforated plate made of iron as a negative electrode core body so that the thickness was constant, thereby producing an intermediate product of the negative electrode. Note that this perforated plate had a thickness of 60 μm and the surface thereof was plated with nickel.

Here, when it was confirmed whether the paste of the negative electrode mixture could be uniformly coated on the negative electrode core body, it was confirmed that the paste of the negative electrode mixture could be uniformly coated. In other words, there occurred no trouble such as the paste of the negative electrode mixture paste dripping down or being thinned locally, and an intermediate product of a negative electrode could be produced without any trouble.

After the paste was dried, the intermediate product of the negative electrode holding the hydrogen storage alloy powder and the like was further rolled out to increase the amount of alloy per volume, and then cut by 40 mm in width and 110 mm in length, thereby obtaining the negative electrode 26 for AA-size. Here, whether the negative electrode could be manufactured is indicated in a column "MANUFACTURABILITY OF NEGATIVE ELECTRODE" in Table 1. In Table 1, when the negative electrode can be manufactured, it is indicated by "MANUFACTURABLE", and when the negative electrode could not be manufactured, it is indicated by "UNMANUFACTURABLE". Evaluations for the examples 2 to 4, and the comparative examples 1 and 2 described later are likewise made.

Note that totally two sheets of negative electrodes 26 were produced as one sheet for battery assembly and one sheet for measurement of the dropout amount of an active material.

(2) Production of Positive Electrode

Nickel sulfate, zinc sulfate, magnesium sulfate, and cobalt sulfate were weighed so that the composition of these materials included 3% by mass of zinc, 0.4% by mass of magnesium, and 1% by mass of cobalt with respect to nickel, and these materials were added to an aqueous sodium hydroxide solution of 1N containing ammonium ions to prepare a mixed aqueous solution. A sodium hydroxide aqueous solution of 10N was gradually added to the resultant mixed aqueous solution while stirring the resultant mixed aqueous solution, thereby causing a reaction therebetween. The pH during the reaction was stabilized at 13 to 14 to generate nickel hydroxide particles containing nickel hydroxide as a main component in which zinc, magnesium and cobalt were dissolved.

Note that the resultant nickel hydroxide particles were washed at three times with pure water whose amount was 10 times as large as the amount of the nickel hydroxide particles, then dehydrated and dried. Note that the resultant nickel hydroxide particles had spherical shapes having a mean particle size of 10 μm.

Next, 100 parts by mass of positive electrode active material powder which was an aggregate of nickel hydroxide particles produced as described above was mixed with 10 parts by mass of cobalt hydroxide powder was mixed with, and further mixed with 0.5 parts by mass of yttrium oxide, 0.3 parts by mass of zinc oxide, 40 parts by mass of HPC dispersion liquid, and 30 parts by mass of water to prepare a positive electrode mixture paste, and this positive electrode mixture paste was filled in a sheet-like nickel foam as a positive electrode substrate. After the filled positive electrode mixture paste was dried, the nickel foam filled with the positive electrode mixture was rolled out and cut in a predetermined shape to obtain a positive electrode 24 of AA-size.

(3) Assembly of Nickel Metal Hydride Secondary Battery

The resultant positive electrode 24 and negative electrode 26 were spirally wound with a separator 28 sandwiched therebetween to produce an electrode group 22. The separator 28 used in this production step of the electrode group 22 included a nonwoven fabric made of polypropylene fiber which had been subjected to a sulfonation treatment, and the thickness thereof was 0.1 mm (53 g/m$^2$ in weight per unit area).

On the other hand, an alkaline electrolyte including an aqueous solution containing KOH, NaOH and LiOH was prepared. Here, the alkaline electrolyte contained KOH, NaOH and LiOH in a ratio of KOH to NaOH to LiOH of 0.8:7.0:0.02.

Next, the electrode group 22 described above was accommodated in the cylindrical outer packaging can 10 having a bottom, and a predetermined amount of the prepared alkaline electrolyte was injected into the outer packaging can 10. Thereafter, the opening of the outer packaging can 10 was blocked with the sealing body 11, thereby assembling an AA-size nickel metal hydride secondary battery 2 having a nominal capacity of 2000 mAh. Here, the nominal capacity was defined by a discharging capacity when charging was performed with a charging current of 0.2 A for 16 hours under an environment of a temperature of 25° C. and then discharging was performed with a discharging current of 0.4 A until the battery voltage was equal to 1.0 V after initial activation processing was performed by repeating, five times, a charging and discharging operation of performing charging with a charging current of 0.2 A for 16 hours under an environment of a temperature of 25° C., and then performing discharging with a discharging current of 0.4 A until a battery voltage was equal to 1.0 V.

Example 2

Hydrogen storage alloy powder was prepared in the same manner as in the example 1 except that the sixth cleaning was omitted in the cleaning step of hydrogen storage alloy powder, a negative electrode was produced by using the resultant hydrogen storage alloy powder, and a nickel metal hydride secondary battery was produced by using the resultant negative electrode.

Example 3

Hydrogen storage alloy powder was produced in the same manner as in the example 1 except that the fifth cleaning and the sixth cleaning were omitted in the cleaning step of the hydrogen storage alloy powder, a negative electrode was formed by using the resultant hydrogen storage alloy powder, and a nickel metal hydride secondary battery was produced using the resultant negative electrode.

Example 4

A nickel metal hydride secondary battery was produced in the same manner as in the example 1 except that the acid treatment was omitted.

Comparative Example 1

Hydrogen storage alloy powder was produced in the same manner as in the example 1 except that the same operation as the third cleaning was repeated one more time, and thus the cleaning was performed totally 7 times, a negative electrode was produced by using the resultant hydrogen storage alloy powder, and a nickel metal hydride secondary battery was produced by using the resultant negative electrode.

Comparative Example 2

Hydrogen storage alloy powder was prepared in the same manner as in the example 1 except that the fourth cleaning, the fifth cleaning and the sixth cleaning were omitted in the cleaning step of the hydrogen storage alloy powder, a negative electrode was produced by using the resultant hydrogen storage alloy powder, and a nickel metal hydride secondary battery was produced by using the resultant negative electrode.

2. Evaluation of Negative Electrode

The mass of the negative electrode for measuring the dropout amount of the active material was measured. This mass is referred to as "before-cutting mass". Next, the negative electrode for measuring the dropout amount of the active material was cut at 10 times at an interval of 10 mm in the length direction thereof by using a cutting machine. In other words, the negative electrode for measuring the dropout amount of the active material was cut into ten strip-shaped parts each having a width of 40 mm and a length of 10 mm. Next, the total mass of the ten strip-shaped parts after the cutting was measured. This mass is referred to as "after-cutting mass". When a mass change rate before and after the cutting exceeded 3%, it was determined that the negative electrode active material dropped out. When the mass change rate was 3% or less, it was determined that the negative electrode active material did not drop out. This result is shown in a column of "DROPOUT OR NO DROPOUT OF NEGATIVE ELECTRODE ACTIVE MATERIAL" in Table 1.

Here, the mass change rate was determined by the following equation (iv).

Mass change rate[%]=(before-cutting mass−after-cutting mass)/(before-cutting mass)×100　　　(iv)

When there is no dropout of the active material, it indicates that short circuit in the battery is hard to occur and the quality of the battery is high. When there is dropout of the active material, it indicates that internal short circuit of the battery occurs due to the dropout active material is high with high possibility and the quality of the battery is low.

TABLE 1

|  | Concentration of chlorine [ppm] | Saturation magnetization [emu/g] | d10 [μm] | Volume mean particle size MV [μm] | Separation or no separation in paste after one hour | Dropout or no dropout of negative electrode active material | Manufacturability of negative electrode |
|---|---|---|---|---|---|---|---|
| Example 1 | 180 | 2.29 | 11.1 | 35.0 | Not separated | No dropout | Manufacturable |
| Example 2 | 300 | 2.15 | 11.3 | 35.2 | Not separated | No dropout | Manufacturable |

TABLE 1-continued

|  | Concentration of chlorine [ppm] | Saturation magnetization [emu/g] | d10 [μm] | Volume mean particle size MV [μm] | Separation or no separation in paste after one hour | Dropout or no dropout of negative electrode active material | Manufacturability of negative electrode |
|---|---|---|---|---|---|---|---|
| Example 3 | 780 | 2.23 | 11.0 | 34.2 | Not separated | No dropout | Manufacturable |
| Example 4 | 180 | — | 11.0 | 35.0 | Not separated | No dropout | Manufacturable |
| Comparative example 1 | 102 | 2.07 | 13.4 | 38.1 | Not separated | No dropout | Manufacturable |
| Comparative example 2 | 870 | 2.17 | 10.7 | 34.1 | Separated | Dropout | Unmanufacturable |

3. Consideration

In the examples 1 to 4, the concentration of chlorine on the surfaces of the hydrogen storage alloy particles is in the range from not less than 180 ppm to not more than 780 ppm. When the concentration of chlorine is within this range, the separation of the negative electrode mixture paste does not occur, and the negative electrode active material does not drop out. Therefore, it is considered that this condition is suitable for manufacturing of batteries. Further, it is considered that in the cleaning for maintaining the chlorine concentration within the above range, the volume mean particle size can be maintained at about 34.2 μm to 35.2 μm, and the charging and discharging characteristics of the obtained battery can be kept in an excellent state.

Particularly, for the batteries of the examples 1 to 3 containing the hydrogen storage alloy particles which were subjected to the acid treatment with hydrochloric acid and had Ni-rich layers formed on the surfaces thereof, it is considered that the charging and discharging reactivity is higher than that of the battery of the example 4 containing the hydrogen storage alloy particles which were not subjected to the acid treatment and had no Ni-rich layer formed on the surfaces thereof.

In the comparative example 1, the concentration of chlorine on the surfaces of the hydrogen storage alloy particles is 102 ppm. In order to reduce the concentration of chlorine to this level, the frequency of cleaning must be increased. As a result, particles having relatively small particle sizes flow out together with the cleaning water, so that the percentage of particles having large particle sizes increases, and the volume mean particle size is as large as 38.1 μm. If the volume mean particle size of the hydrogen storage alloy particles is equal to 38.1 μm as in the comparative example 1, it is expected that the charging and discharging characteristics of the battery of the comparative example 1 to be obtained would deteriorate as compared with the charging and discharging characteristics of the examples 1 to 4 in which the volume mean particle size of the hydrogen storage alloy particles is equal to 34.2 μm to 35.2 μm. Particularly, regarding the charging and discharging characteristics under a low temperature environment of 0° C. or less, it is considered that the battery of the comparative example 1 is inferior to the batteries of the examples 1 to 4.

In the comparative example 2, since the frequency of the cleaning was reduced, the volume mean particle size of the hydrogen storage alloy particles is equal to 34.1 μm, and a state where the volume mean particle size of the hydrogen storage alloy particles is smaller than that of the example 3 is kept. However, the concentration of chlorine on the surfaces of the hydrogen storage alloy particles is equal to 870 ppm, and a relatively large amount of chlorine remains. For this reason, the remaining chlorine changes the properties of the binder and thickener contained in the negative electrode mixture paste, and separates the negative electrode mixture paste into the negative electrode mixture component and water. For this reason, it is considered that it is impossible to manufacture a negative electrode, and the comparative example 2 is not suitable for manufacturing a battery. An attempt was made to produce a negative electrode by using the negative electrode mixture paste under the above state, it can be said that the obtained negative electrode has a problem in the quality of the battery due to dropout of the negative electrode active material.

As described above, according to the present disclosure, there can be provided a negative electrode for a nickel metal hydride secondary battery that can contribute to enhancing the charging and discharging characteristics in a nickel metal hydride secondary battery while sufficiently ensuring manufacturability, a method for manufacturing the negative electrode, a nickel metal hydride secondary battery using the negative electrode, and hydrogen storage alloy powder.

Note that the present disclosure is not limited to the above-described embodiments and examples, and various modifications are possible. For example, the nickel metal hydride secondary battery may be a square-shaped battery, and a mechanical structure thereof is not exceptionally limited.

<Aspects of the Disclosure>

A first aspect of the present disclosure is a negative electrode for a nickel metal hydride secondary battery that includes a negative electrode core body, and a negative electrode mixture carried on the negative electrode core body, wherein the negative electrode mixture includes hydrogen storage alloy powder that is an aggregate of hydrogen storage alloy particles, a binder and a thickener, and the hydrogen storage alloy particles have a volume mean particle size of 40 μm or less and a chlorine concentration of not less than 180 ppm to not more than 780 ppm.

According to the first aspect, in order to keep the chlorine concentration within the above range, it is not necessary to clean excessively to the extent that the hydrogen storage alloy particles having small particle sizes flow out. Therefore, the amount of the hydrogen storage alloy particles having small particle sizes can be maintained, the reduction of the reaction area of the hydrogen storage alloy can be suppressed, and predetermined charging and discharging characteristics can be obtained. When the chlorine concentration is within the above range, the functions of the binder and the thickener are not hindered, and the manufacturability of the negative electrode is not affected.

A second aspect of the present disclosure is a negative electrode for a nickel metal hydride secondary battery in which in the above-mentioned first aspect of the present disclosure, the hydrogen storage alloy has a composition represented by a general formula: $Ln_{1-x}Mg_xNi_{y-a}Al_a$ (where Ln in the formula represents at least one element selected from the group consisting of a rare earth element, Ti and Zr, and x, y, a satisfy conditions of $0<x<0.30$, $2.80 \leq y \leq 3.90$, and $0.10 \leq a \leq 0.25$, respectively.).

According to the second aspect, since the hydrogen storage alloy has excellent hydrogen storage ability, the capacity of the obtained nickel metal hydride secondary battery can be increased.

A third aspect of the present disclosure is a negative electrode for a nickel metal hydride secondary battery in which in the above-described first or second aspect of the present disclosure, each of the hydrogen storage alloy particles has a core portion, and a surface layer covering a surface of the core portion, and the surface layer is a Ni-rich layer having a higher concentration of Ni than the core portion.

According to the third aspect, the surface of the hydrogen storage alloy is activated, and the charging and discharging reaction in the hydrogen storage alloy (negative electrode) is promoted.

A fourth aspect of the present disclosure is a negative electrode for a nickel metal hydride secondary battery in which in any one of the first to third aspects of the present disclosure, the hydrogen storage alloy powder has a saturation magnetization of not less than 1.7 emu/g to not more than 15 emu/g.

According to the fourth aspect, an appropriate amount of a Ni-rich layer is formed on the surfaces of the hydrogen storage alloy particles, and the charging and discharging reaction in the hydrogen storage alloy (negative electrode) is promoted.

A fifth aspect of the present disclosure is a negative electrode for a nickel metal hydride secondary battery in which in any one of the first to fourth aspects of the present disclosure described above, the negative electrode mixture further includes hollow carbon black having a hollow shell-like structure as a conductive material.

According to the fifth aspect, the conductivity of the negative electrode is enhanced, and the high-rate discharging performance and rapid charging performance of the nickel metal hydride secondary battery is improved.

A sixth aspect of the present disclosure is a method of manufacturing a negative electrode for a nickel metal hydride secondary battery, comprising: a powder preparing step of preparing hydrogen storage alloy powder which is an aggregate of hydrogen storage alloy particles having a volume mean particle size of 40 µm or less; a cleaning step of immersing the hydrogen storage alloy powder in either water or an alkali aqueous solution to clean the hydrogen storage alloy powder; a paste preparing step of mixing and kneading the hydrogen storage alloy powder that has been subjected to the cleaning step, and a binder, a thickener and water that has been prepared in advance, thereby preparing a negative electrode mixture paste; a paste coating step of coating the negative electrode mixture paste obtained in the paste preparing step onto a negative electrode core body; and a drying step of drying the negative electrode mixture paste, wherein cleaning in the cleaning step is performed so that a concentration of residual chlorine is in a range from not less than 180 ppm to not more than 780 ppm.

According to the sixth aspect, it is possible to manufacture a negative electrode for a nickel metal hydride secondary battery that can contribute to enhancement of the charging and discharging characteristics of the nickel metal hydride secondary battery while ensuring sufficient manufacturability.

A seventh aspect of the present disclosure is a method of manufacturing a negative electrode for a nickel metal hydride secondary battery in which in the sixth aspect of the present disclosure described above, an acid treatment step of subjecting the hydrogen storage alloy powder to an acid treatment is further provided between the powder preparing step and the cleaning step.

According to the seventh aspect, it is possible to manufacture a negative electrode for a nickel metal hydride secondary battery including hydrogen storage alloy particles having Ni-rich layers formed on the surfaces thereof.

An eighth aspect of the present disclosure is a method of manufacturing a negative electrode for a nickel metal hydride secondary battery in which in the seventh aspect of the present disclosure described above, the acid treatment step immerses the hydrogen storage alloy powder in hydrochloric acid to perform an acid treatment.

According to the eighth aspect, the Ni-rich layers can be formed relatively easily.

A ninth aspect of the present disclosure is a nickel metal hydride battery including a container, and an electrode group that is accommodated together with an alkaline electrolyte in the container, wherein the electrode group includes a positive electrode and a negative electrode stacked with a separator interposed therebetween, and the negative electrode is the negative electrode for a nickel metal hydride secondary battery of any one of the first to fifth aspects of the present disclosure described above.

According to the ninth aspect, a nickel metal hydride secondary battery having excellent charging and discharging characteristics and high quality can be obtained.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A negative electrode for a nickel metal hydride secondary battery comprising:
    a negative electrode core body; and
    a negative electrode mixture carried on the negative electrode core body, wherein the negative electrode mixture includes hydrogen storage alloy powder that is an aggregate of hydrogen storage alloy particles, a binder and a thickener, and the hydrogen storage alloy particles have a volume mean particle size of 40 µm or less and a chlorine concentration of not less than 180 ppm to not more than 780 ppm,
    wherein each of the hydrogen storage alloy particles has a core portion and a surface layer covering a surface of the core portion, and the surface layer is a Ni-rich layer having a higher concentration of Ni than the core portion, and
    wherein the hydrogen storage alloy has a composition represented by a general formula: $Ln_{1-x}Mg_xNi_{y-a}Al_a$, where Ln in the formula represents at least one element selected from the group consisting of a rare earth element, Ti and Zr, and x, y, and a satisfy conditions of $0<x<0.30$, $2.80 \leq y \leq 3.90$, and $0.10 \leq a \leq 0.25$, respectively.

2. The negative electrode for a nickel metal hydride secondary battery according to claim 1, wherein the hydrogen storage alloy powder has a saturation magnetization of not less than 1.7 emu/g to not more than 15 emu/g.

3. The negative electrode for a nickel metal hydride secondary battery according to claim 1, wherein the negative electrode mixture further includes hollow carbon black having a hollow shell structure as a conductive material.

4. A method of manufacturing a negative electrode for a nickel metal hydride secondary battery, comprising:

a powder preparing step of preparing hydrogen storage alloy powder which is an aggregate of hydrogen storage alloy particles having a volume mean particle size of 40 μm or less;

a cleaning step of immersing the hydrogen storage alloy powder in either water or an alkali aqueous solution to clean the hydrogen storage alloy powder;

a paste preparing step of mixing and kneading the hydrogen storage alloy powder that has been subjected to the cleaning step, and a binder, a thickener and water that has been prepared in advance, thereby preparing a negative electrode mixture paste;

a paste coating step of coating the negative electrode mixture paste obtained in the paste preparing step onto a negative electrode core body; and a drying step of drying the negative electrode mixture paste, wherein cleaning in the cleaning step is performed so that a concentration of residual chlorine is in a range from not less than 180 ppm to not more than 780 ppm, wherein each of the hydrogen storage alloy particles has a core portion and a surface layer covering a surface of the core portion, and the surface layer is a Ni-rich layer having a higher concentration of Ni than the core portion, wherein the hydrogen storage alloy has a composition represented by a general formula: $Ln_{1-x}Mg_xNi_{y-a}Al_a$, where Ln in the formula represents at least one element selected from the group consisting of a rare earth element, Ti and Zr, and x, y, and a satisfy conditions of $0<x<0.30$, $2.80 \leq y \leq 3.90$, and $0.10 \leq a \leq 0.25$, respectively.

5. The method of manufacturing a negative electrode for a nickel metal hydride secondary battery according to claim 4, wherein an acid treatment step of subjecting the hydrogen storage alloy powder to an acid treatment is further provided between the powder preparing step and the cleaning step.

6. The method of manufacturing a negative electrode for a nickel metal hydride secondary battery according to claim 5, wherein the acid treatment step comprises immersing the hydrogen storage alloy powder in hydrochloric acid to perform the acid treatment.

7. A nickel metal hydride battery comprising:

a container; and an electrode group that is accommodated together with an alkaline electrolyte in the container, wherein the electrode group includes a positive electrode and a negative electrode stacked with a separator interposed therebetween, and the negative electrode is the negative electrode for a nickel metal hydride secondary battery according to claim 1.

* * * * *